(12) United States Patent
Wessel (10) Patent No.: US 8,939,602 B2
(45) Date of Patent: *Jan. 27, 2015

(54) CONVERTIBLE WORK LIGHT

(76) Inventor: Elmer A. Wessel, Lincoln, NE (US)

( * ) Notice: Subject to any disclaimer, the term of this patent is extended or adjusted under 35 U.S.C. 154(b) by 213 days.

This patent is subject to a terminal disclaimer.

(21) Appl. No.: 13/585,660

(22) Filed: Aug. 14, 2012

(65) Prior Publication Data

US 2013/0094196 A1    Apr. 18, 2013

Related U.S. Application Data

(63) Continuation-in-part of application No. 12/647,353, filed on Dec. 24, 2009, now Pat. No. 8,262,248.

(51) Int. Cl.
| | |
|---|---|
| *F21L 4/00* | (2006.01) |
| *F21L 4/04* | (2006.01) |
| *F16M 11/10* | (2006.01) |
| *F16M 11/16* | (2006.01) |
| *F16M 11/24* | (2006.01) |
| *F16M 11/28* | (2006.01) |
| *F21L 4/02* | (2006.01) |
| *F21W 131/10* | (2006.01) |
| *F21Y 101/02* | (2006.01) |
| *F21V 21/06* | (2006.01) |
| *F21V 21/14* | (2006.01) |
| *F21V 21/30* | (2006.01) |

(52) U.S. Cl.
CPC ... *F21L 4/04* (2013.01); *F16M 11/10* (2013.01); *F16M 11/16* (2013.01); *F16M 11/242* (2013.01); *F16M 11/28* (2013.01); *F21L 4/027* (2013.01); *F21L 4/045* (2013.01); *F21W 2131/1005* (2013.01); *F21Y 2101/02* (2013.01); *F21V 21/06* (2013.01); *F21V 21/145* (2013.01); *F21V 21/30* (2013.01)
USPC ........................................ 362/205; 362/208

(58) Field of Classification Search
CPC ................................. F21V 4/04; F21V 21/145
USPC ......... 362/197–199, 190–191, 202, 205, 208, 362/285, 418
See application file for complete search history.

(56) References Cited

U.S. PATENT DOCUMENTS

| | | |
|---|---|---|
| 4,506,317 A | 3/1985 | Duddy |
| 4,533,982 A | 8/1985 | Kozar |
| 4,581,686 A | 4/1986 | Nelson |
| 4,870,543 A | 9/1989 | Born et al. |
| 5,319,365 A | 6/1994 | Hillinger |

(Continued)

*Primary Examiner* — Vip Patel
(74) *Attorney, Agent, or Firm* — Geoffrey E. Dobbin; Dobbin IP Law P.C.

(57) ABSTRACT

Disclosed is a work light with convertible configurations. First is a light head mounted upon a stand with an extendable neck. The second is a flashlight. A third is presented when the neck is extended in the flashlight mode. The stand is ideally a tripod with legs collapsible into a central body to form the flashlight handle, a movable stop being provided to support the legs when deployed. A double linkage hinge is also provided the head and neck. Magnets may be applied at both the head and the end of an extendable retainer cap such that the work light may be used as an extendable pick up tool with the magnet in the head and it may be mounted solely by the magnet in the cap, even against the pull of gravity. The extendible retainer cap may also be utilized as an extra center leg.

20 Claims, 8 Drawing Sheets

(56) References Cited

U.S. PATENT DOCUMENTS

| | | |
|---|---|---|
| 6,454,228 B1 | 9/2002 | Bosnakovic |
| 6,669,353 B2 | 12/2003 | Kung |
| 7,011,423 B2 | 3/2006 | Chen |
| 7,063,444 B2 | 6/2006 | Lee et al. |
| 7,224,271 B2 | 5/2007 | Wang |
| 7,364,320 B2 | 4/2008 | Van Deursen et al. |
| 7,467,875 B1 | 12/2008 | Rama |
| 2006/0262518 A1 | 11/2006 | Thuma et al. |

CONVERTIBLE WORK LIGHT

CROSS-REFERENCES TO RELATED APPLICATIONS

This Application claims priority as a continuation-in-part of prior filed U.S. non-provisional application Ser. No. 12/647,353, filed Dec. 24, 2009, and incorporates the same in its entirety by reference herein.

TECHNICAL FIELD

The present invention relates to the field of portable illumination and more particularly relates to a work light convertible from a work light with a stand to a pocket-sized flashlight.

BACKGROUND ART

Portable illumination has become a necessity of modern life. This is especially true in work situations, where relocating a light source can be necessary for effective viewing of a work area, such as inside a furnace, in a crawl-space or other tight situation. Commensurate with the need of relocation, is the need to statically hold a light source in a desired position. To this end, lighting systems using various forms of stands and clamps have been developed to secure light sources of various types in freestanding and supported configurations. Support means have included magnets for ferrous/magnetic surfaces.

One recent innovation has been to provide a work light with a collapsible stand such that it may then be used as a flashlight, with the stand becoming the handle of the flashlight. Until now, any convertible work lights that utilize the same basic principals use complex locking and deployment mechanisms, or independent legs which form a less stable tripod.

The present invention is a convertible work light that presents a tripod base which, when stowed, become the entire grasping portion of a handle for a flashlight configuration. The work light is structured for ease of use with a key structure to secure the head when stowed and for rapid and stable deployment.

The present invention represents a departure from the prior art in that the work light of the present invention allows for rapid and efficient deployment with simple and secure stowage. It also provides additional stability and fastening options and significant extension of the stand portion of the work light when deployed and efficient use when in a stowed, flashlight, configuration.

DISCLOSURE OF THE INVENTION

In view of the foregoing disadvantages inherent in the known types of work lights, this invention provides a convertible work light with increased support when deployed and a smaller profile when in a stowed, flashlight, configuration. As such, the present invention's general purpose is to provide a new and improved extendable work light that is easily deployed, stable, easily stowed and usable when in a stowed configuration. The work light of the present invention also provides complete range of direction for directing an emitted light beam.

To accomplish these objectives, the work light comprises a head portion, containing the light and power sources, and a body portion, containing the legs and support structure, being connected by an extendable neck. The legs are spring biased to maintain an open, work stand, configuration while the head itself serves to hold the legs against the spring bias to maintain a stowed, flashlight, configuration. A twisting switch configuration is utilized to turn the light on and off. A keying structure is provided to lock a lower portion of the head against the body assembly and/or tripod legs when the work light is stowed for ease of activating the light. Magnets may be provided to anchor the work light on ferrous surfaces, such magnets being sufficient to secure the work light upside down against gravity. The work light may also act as an extendable pickup tool for dropped metal parts and tools.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BEST MODE FOR CARRYING OUT THE INVENTION

With reference now to the drawings, the preferred embodiment of the work light is herein described. It should be noted that the articles "a", "an", and "the", as used in this specification, include plural referents unless the content clearly dictates otherwise.

With reference to FIGS. 1-5, the work light comprises a head 10 and a handle 20. A retainer cap 32 is positioned at a bottom of the work light. Head 10 is ideally suited to be activated by a twisting switch. Accordingly, the depicted head is shown to have two portions, 14 and 16, which are rotatable with relation to one another. For added convenience, a foot magnet 34 is added to the retainer cap 32.

Figure 1:
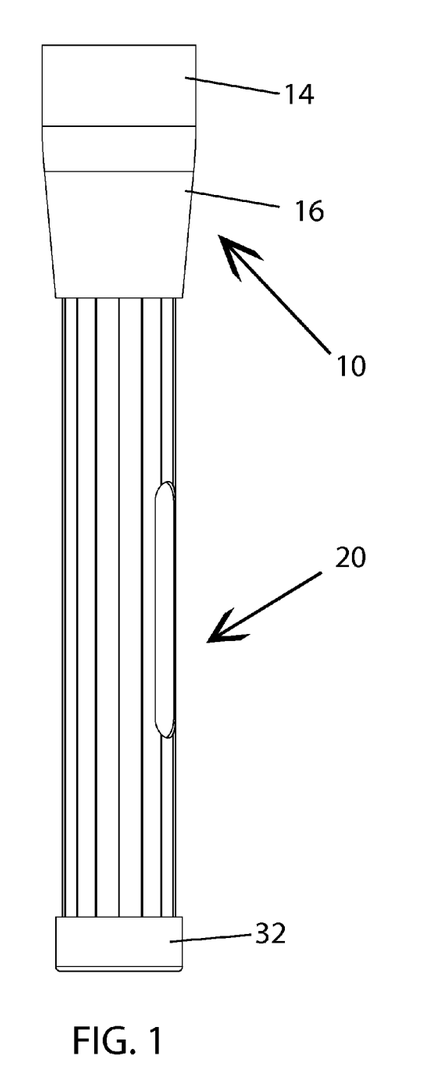
FIG. 1 is a side elevation a work light according to an embodiment of the present invention, stowed.
Figure 2:
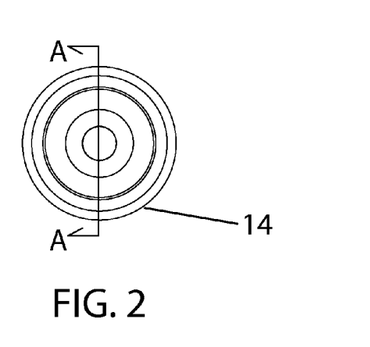
FIG. 2 is a top plan view of the work light of FIG. 1.
Figure 3:
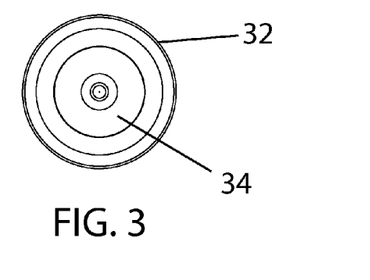
FIG. 3 is bottom plan view of the work light of FIG. 1.
Figure 4:
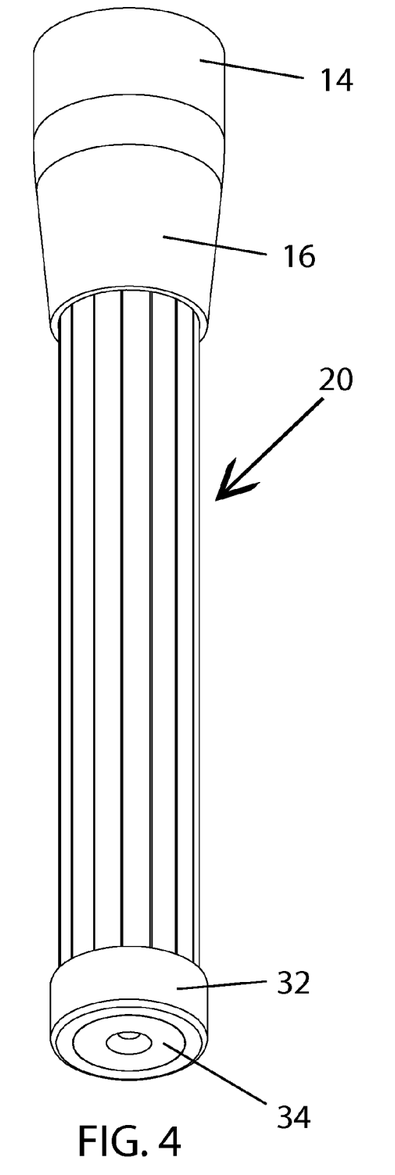
FIG. 4 is a perspective view of the work light of FIG. 1.
Figure 5:
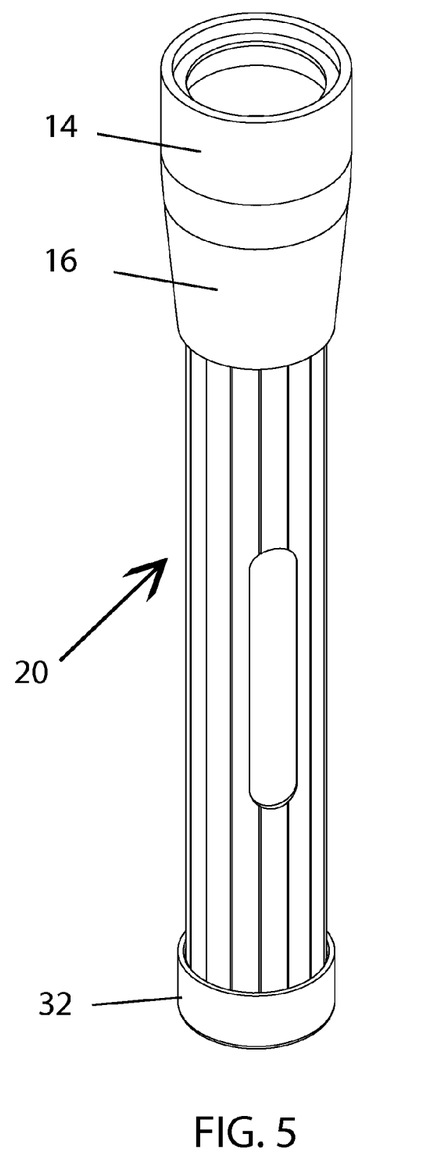
FIG. 5 is an alternate perspective view of the work light of FIG. 1
Figure 6:
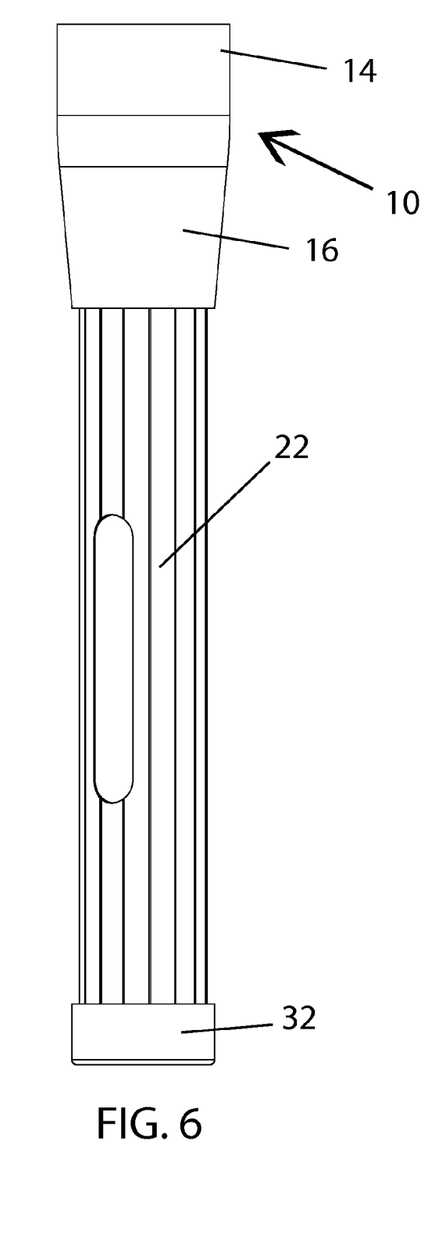
FIG. 6 is an alternate side elevation of the work light of FIG. 1.
Figure 7:
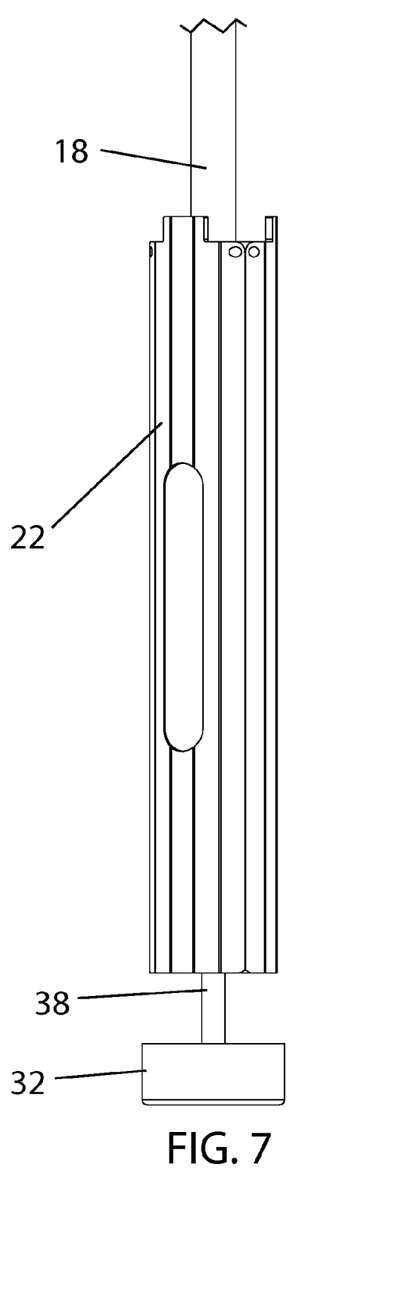
FIG. 7 is a partial side elevation of the work light of FIG. 6, in a state of partial deployment
Figure 8:
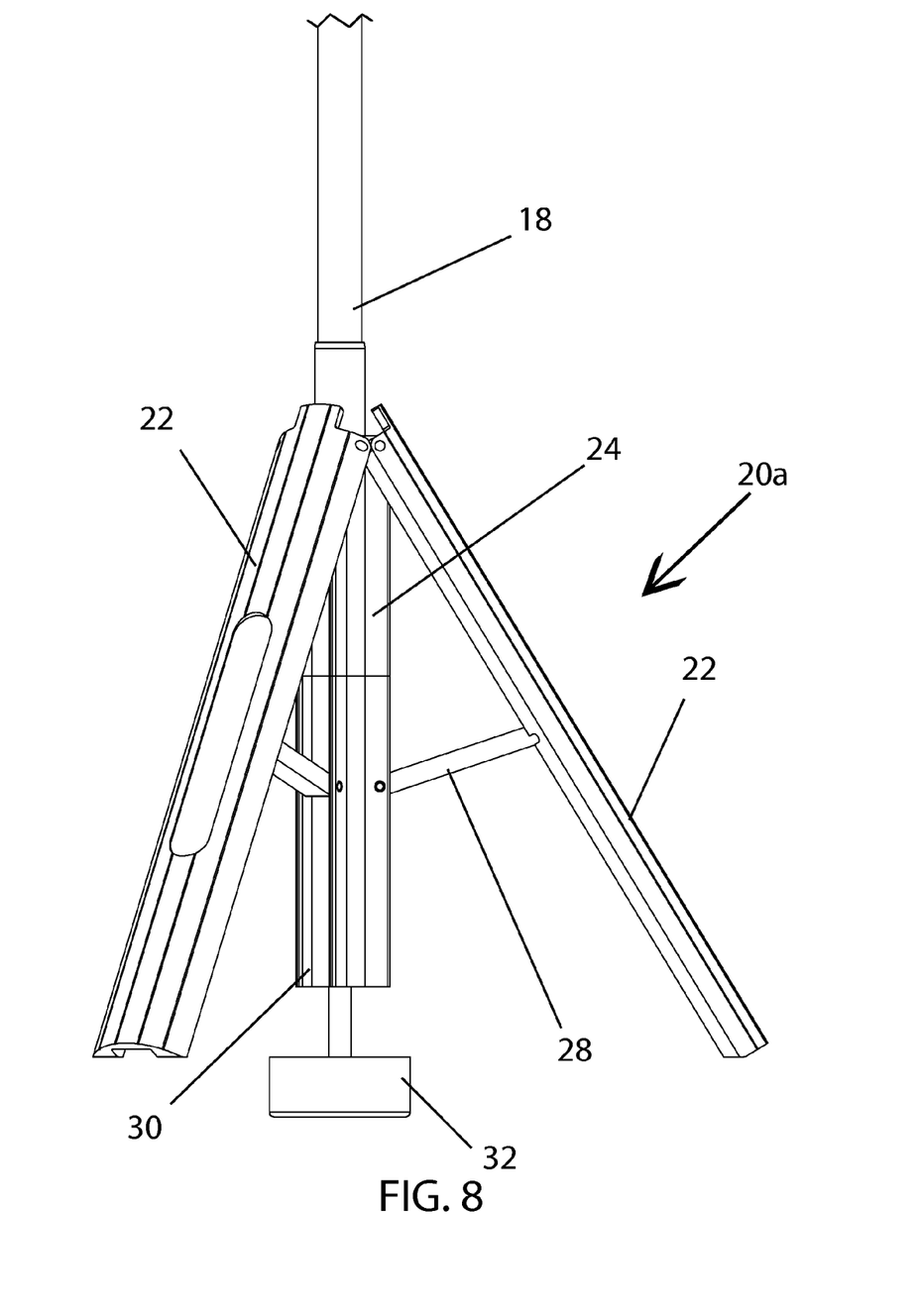
FIG. 8 is a partial side elevation of the work light of FIG. 6, deployed.
Figure 9:
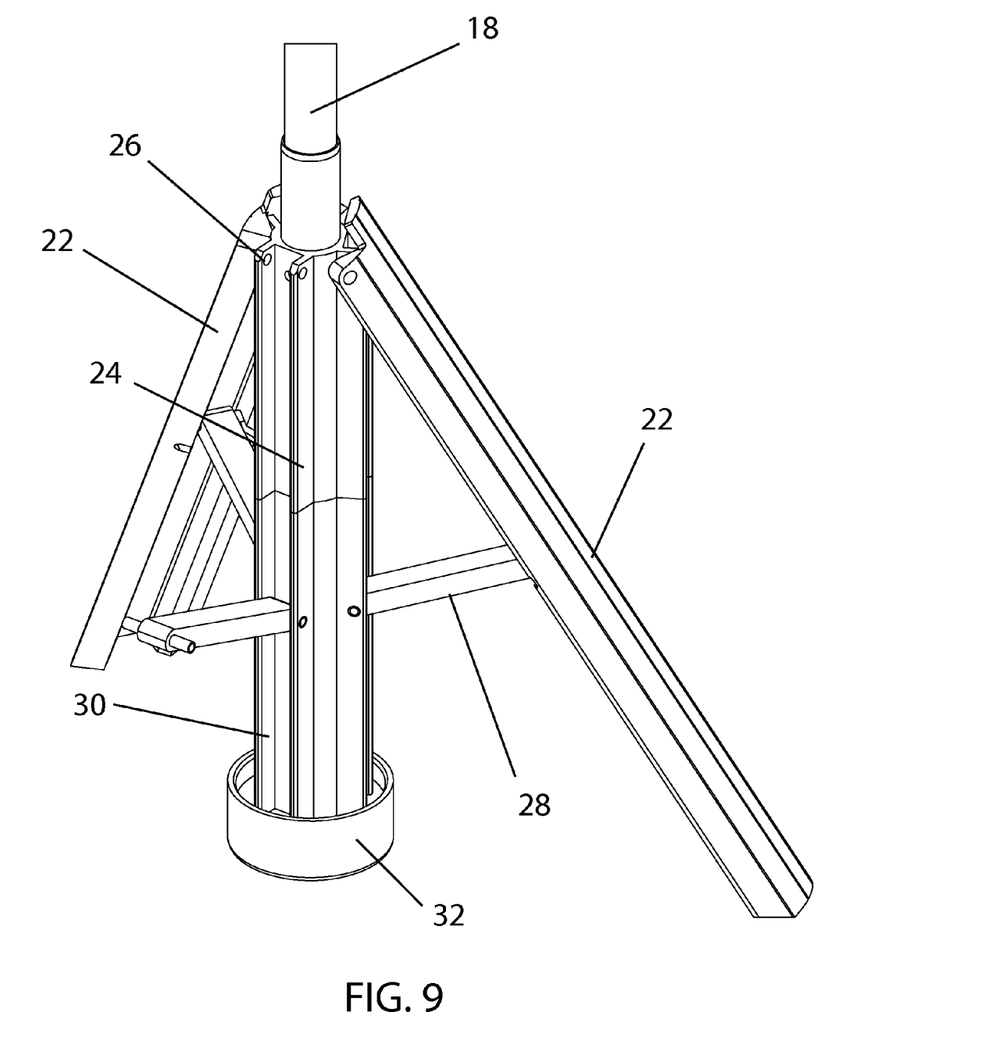
FIG. 9 is a partial side elevation of the work light of FIG. 8, with one leg removed.

As shown in FIGS. 6-8, head 10 and retainer cap 32 may be extended outward from the handle 20, head 10 being located on a far end of extendable neck 18 and retainer cap on extendable arm 38. Handle 20 further comprises a plurality of legs 22 that are hingedly attached to a body 24 which contains extendable neck 18. They are also hingedly attached to support braces 28 which connect legs 22 to a movable stop 30. As legs 22 are separated, movable stop 30 is raised in relation to the legs 22 and body 24, until it abuts body 24 and halts the separation of the legs 22. When opened, each leg 22 pulls on the stop 30 in a different direction, keeping it centered below the body 24. As the support braces 28 are of fixed length, the stop 30 is then drawn upwards against the body 24, thus preventing further extension of the legs 22 and providing a stable stand 20*a* upon which the work light is mounted. This is accomplished by each of the support braces 28 being attached to the legs 22 above the stop 30. The angles and lengths of the legs 22 and the stop 30 and body 24 are such that when deployed, the stop/body combination may act as a center leg. Ideally, the number of legs 22 is three, so the stand is a stable tripod. As can be seen in FIG. 9, the legs 22 are ideally spring-loaded to default to a deployed state by the simple addition of a spring (not shown) positioned at spring mounts 26 on the body 24 by the top of each leg 22.

Figure 10:
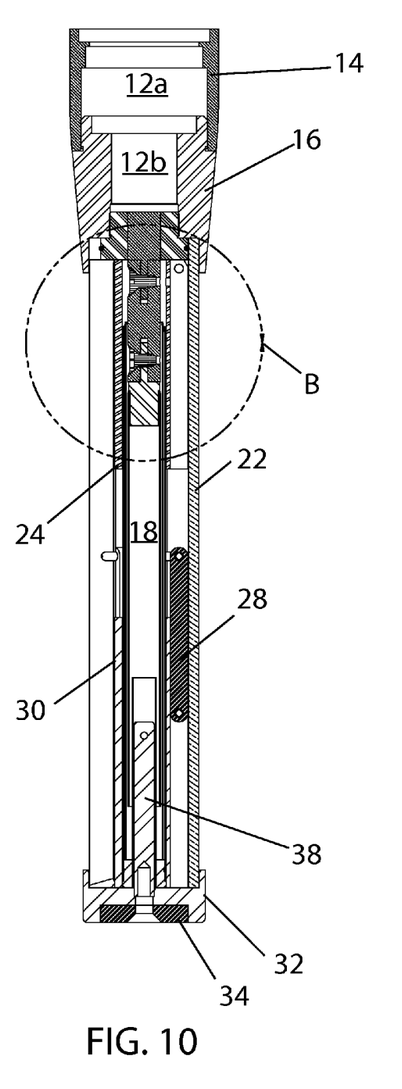
FIG. 10 is a sectional view of the work light of FIG. 2, taken along line A-A.

As shown in FIG. 10, the legs 22 fold against the body 24 to form a handle 20 that is graspable by a user such that the work light may be used as a flashlight. It should be noted in FIGS. 1, 4 and 5 that the outer surfaces of the legs 22 form an entire perimeter of the handle 20. Utility is increased by the addition of a foot magnet 34 on the retainer cap 32. This foot magnet 34 may be used to further anchor the work light on ferrous surfaces and preferably should have sufficient strength to secure the work light upside down or on a vertical surface. The magnet's strength then allows use in otherwise hard to use places, like a furnace interior, or placement in more convenient positions, such as on a metal car fender as opposed to unlevel gravel when changing a tire. The body 24 and stop 30 both are shaped to accommodate the legs 22 and support braces 28 when stowed.

The head 10 is a generally cylindrical construction with a light source, preferably one or more LED's with an adequate battery. These components of the light source and others for focusing and directing the beam are located in chambers 12*a* and 12*b* of the head 10, shown in FIG. 10. The switching mechanism may be any type known in the art, but the preferred mechanism is a twisting switch, where upper 14 and lower 16 portions of the head 10 are in a threaded relationship and contact is made or broken between the light and battery by twisting the portions relative to each other, thus joining or separating them and the appropriate contacts. The upper portion 14 houses the light itself in chamber 12*a*, along with any focusing and lens structure, while the lower portion 16 houses the battery in chamber 12*b*.

Figure 11:
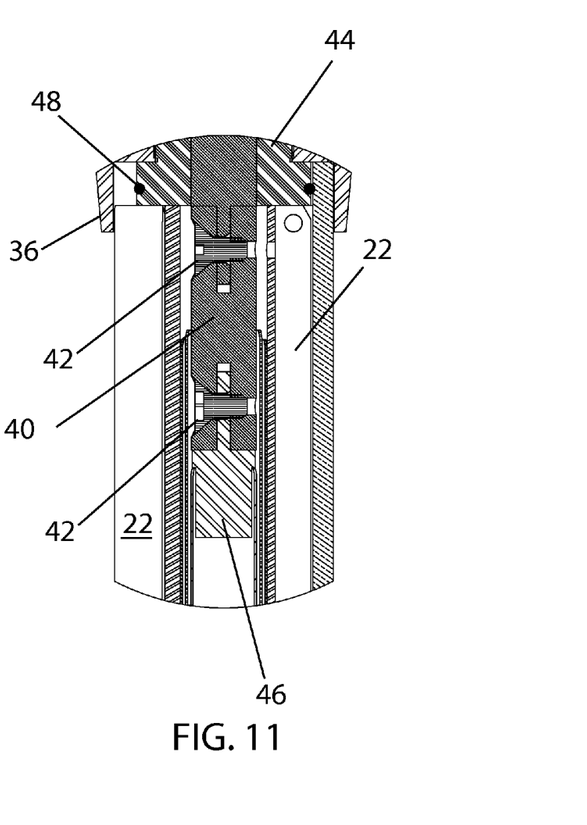
FIG. 11 is a close-up sectional view of the work light of FIG. 9, taken in circle B.
Figures 12, 13, 14:
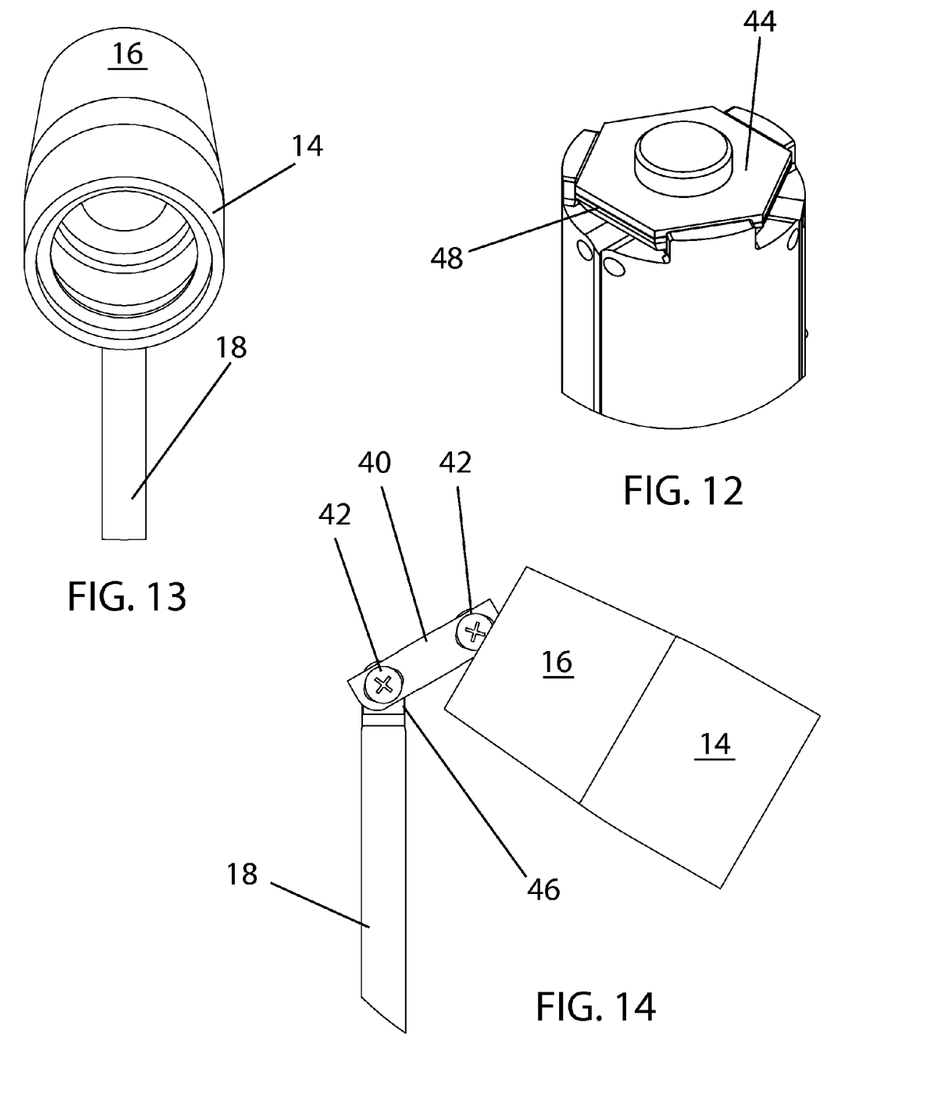
FIG. 12 is a partial perspective view of a work light according to an embodiment of the present invention, with a portion of its head removed.
FIG. 13 is a front elevation of a head of a work light according to an embodiment of the present invention.
FIG. 14 is a side elevation of the head of a work light of FIG. 13.

Since the preferred switch is a twisting mechanism, a keying structure to lock the lower portion 16 of the head 10 relative to the body 24 is desirable. This is best shown in FIGS. 11 and 12. Such a structure allows the user to hold the body/legs when the work light is stowed and just twist the top portion 14 of the head 10. A positive shape is manufactured either on the lower portion 16 (as shown) or on the body 24. A corresponding negative shape is fashioned on the other. In the preferred embodiment, the negative shape is formed by the legs 22 when they are collapsed into the stowed position and the positive shape is provided by the end piece of the head 44, best seen in FIG. 12. The negative shape is accentuated by a tab extending upward from the top of each leg 22. In the preferred embodiment, the keying structure also holds the legs 22 against the spring bias. This is further accomplished by the addition of a rim 36 about the lower portion 16. As can best be seen in FIG. 11, the legs 22 rest next to the end piece of the head 44 while the rim 36 nests around the legs 22 when they are stowed. This arrangement keys and keeps them in place against the springs. There must then be sufficient overlap of the rim 36 over the legs 22 and legs 22 over the end piece 44 to provide adequate interaction, but such sufficiency is determined by many factors, including the strength of the spring, where it is mounted and attaches to the legs, length and material strength of the legs, etc. A similar rim is positioned on retainer cap 32 to hold the legs 22 in the stowed position on their end opposite the spring. When the user then wishes to deploy the work light, the user merely extends the neck 18 and arm 38 while holding the legs 22 and then releases the legs 22 and positions the work light. An elastomeric (usually rubber or plastic) O-ring 48 is positioned about a circumference of the end piece of the head 44 to provide a cushion and tolerance for the legs 22 as they close.

As shown in FIGS. 13 and 14, the head 10 is connected to the body 24 by an extendable neck 18. Neck 18 allows the head 10 to be elevated with respect to the body 24 when it is in either the deployed or stowed states. When stowed, the neck is stored in a bore of the body 24, shown in FIG. 10. Ideally, a head magnet may also be provided for the head so that the work light may be used as an extendable "hand" while stowed; the user then being capable of using the light to locate a dropped part or tool and extending the neck 18 to magnetically attract and pick up said part or tool with the head magnet. The neck 18 is also double hinged 38 at the head 10 and allows the head 10 to rotate, giving a wide range of directional freedom for the head 10. The hinge structure stops when the head is in a vertical orientation so as to ensure alignment with the neck 18 when stowing the work light. The preferred hinge structure comprises a hinge body 40 which receives a connection piece from the end piece on the head 44 and a similar piece 46 on the neck 18. Bolts 42 secure the hinge body 40 at two tabs, one on each connection piece. The hinge body is rounded on one side and has a block corner on the other, thereby forming the limit of rotation needed to ensure the head 10 is in a vertical, coaxial orientation with the neck 18 and the body 24 for proper stowage.

Figures 15, 15A:
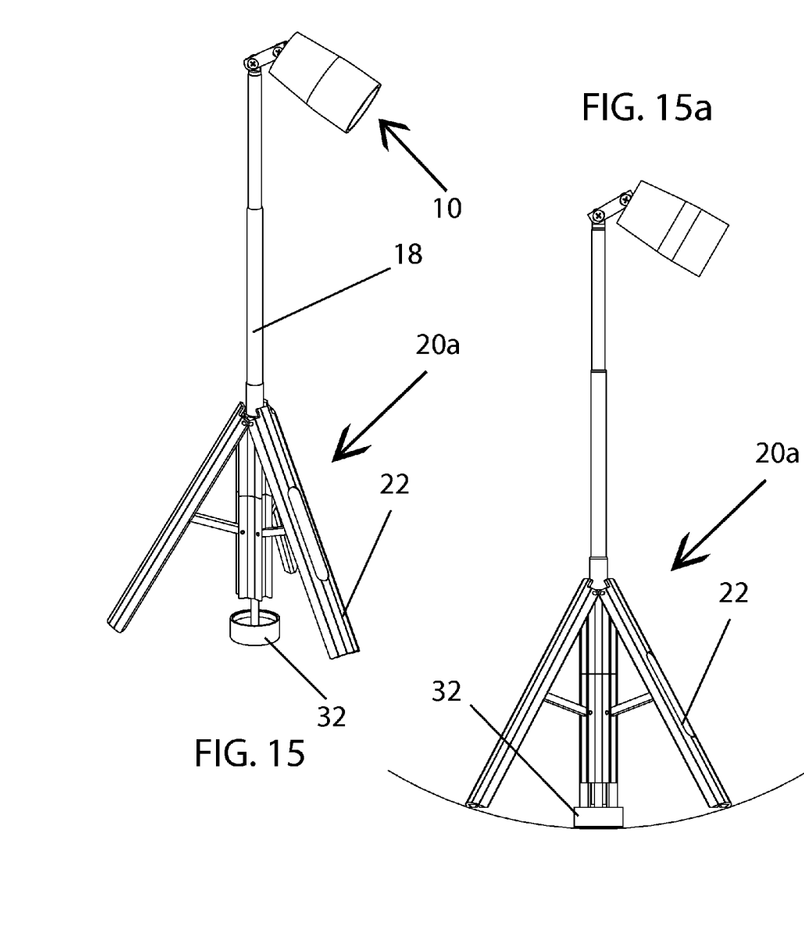
FIG. 15 is a side elevation of the work light of FIG. 1, deployed.
FIG. 15*a* is a side elevation of the work light of FIG. 15, on a concave surface.
Figure 15B:
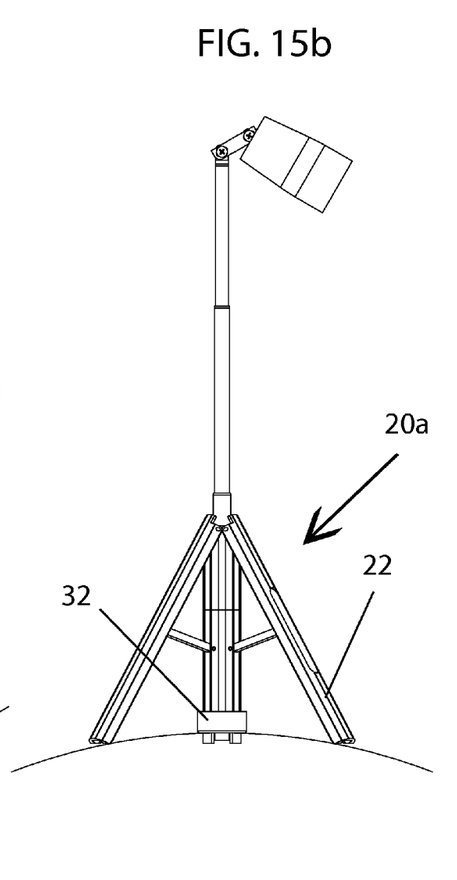
FIG. 15*b* is a side elevation of the work light of FIG. 15, on a convex surface.

The extendable retainer cap 32 (FIG. 15) is positioned on extendable arm 38. When stowed, arm 38 resides in a bore in the stop 30 (FIG. 10). Retainer cap 32 not only adds a retaining component that counters the spring biased leverage of the legs 18 when the light is stowed; but, the retainer cap 32 may also be extended or retracted to position the light on uneven surfaces, such as the concave and convex surfaces depicted in FIGS. 15a and 15b. Coupled with magnet 34, the retainer cap 32 and arm 38 provide a valuable fourth leg to add stability to the work light. Also, the retainer cap may be kept in stowed position while the neck is extended.

Preferred construction of most of the work light's parts is from extruded aluminum. The referred light source is a matrix of at least one LED, the head 10 and body 24 then providing an excellent heat sink. Three legs 22 are preferred. Any fractioning pattern or design and overall cross-sectional shape may be used on the legs 22 to provide a positive gripping surface.

Although the present invention has been described with reference to preferred embodiments, numerous modifications and variations can be made and still the result will come within the scope of the invention. No limitation with respect to the specific embodiments disclosed herein is intended or should be inferred.

INDUSTRIAL APPLICABILITY

The invention is capable of being produced in industry and also capable of furthering industry as an aid to manufacture and repair. Manufacture may involve the molding, cutting and/or extrusion of the component parts from preferred materials, such as aluminum. Uses in industry may be found in any industry where light is required to work on a particular project or product. As such, it has great use in the repair of machines used in industry as such repairs often require the targeted application of light from a stable source.

Alternative embodiments include the use of different switching mechanisms to activate the light. It is to be readily appreciated that any switching mechanism, including throw switches or buttons, known or later developed may be used in place of the twisting mechanism depicted in the figures. While the twisting structure of the switch is one reason to have a keying structure, keeping the keying structure without a twisting switch is still preferred, though would ne not as necessary. It should also be appreciated that the foot magnet and the head magnet may be omitted from the invention. It should also be readily understood that any number of legs may be used with the invention, not just three, so long as the resultant stand is stable. Legs, while ideally spring biased, do not have to be so.

What is claimed is:
1. A work light comprising:
   a. a head, said head being generally cylindrical with a head axis and further comprising:
      i. at least one light source;
      ii. structure to directionally aim light emitted from said at least one light source;
      iii. a power supply for said light source; and
      iv. a switching mechanism to supply power to the at least one light source;
   b. an extendable neck, upon which said head is mounted;
   c. a cylindrical body with a body axis, the extendable neck mounted in said cylindrical body about the body axis and in a manner that it at least partially nests within said cylindrical body when in a stowed configuration;
   d. a plurality of legs, hingedly attached proximate the extendable neck and capable of seating against the cylindrical body when in a stowed position while providing an entire outer circumference for a handle;
   e. leg braces, at least one for each leg, hingedly attached to an inner surface of each leg;
   f. a brace stop, of similar cross-section of the cylindrical body, the brace stop and the leg braces configured in such a manner that the leg braces collapse in a downward fashion, drawing the brace stop away from the cylindrical body, when the work light is in a stowed configuration, and toward the cylindrical body, abutting the cylindrical body and brace stop, when in an deployed configuration; and
   g. a leg retainer cap, positioned on an end of the work light opposite the head and mounted upon an extendable arm.

2. The work light of claim 1, the head comprising two sections capable of rotation relative each other, said sections also being the switching mechanism.

3. The work light of claim 2, further comprising a key structure and a corresponding receiving structure, one being located on a lower portion of the head and the other proximate the extendable neck such that, when the head is stowed, the key structure and receiving structure interact to rotationally secure lower portion of the head relative the cylindrical body.

4. The work light of claim 3, at least one of the set of structures consisting of the key structure and the receiving structure further comprising an elastomeric cushion.

5. The work light of claim 1, further comprising a double hinged joint that joins the head to the extendable neck.

6. The work light of claim 5, the joint further comprising a detent that holds the head in a vertical relationship, such that the head axis and body axis are coaxial.

7. The work light of claim 6, the head comprising two sections capable of rotation relative each other, said sections also being the switching mechanism.

8. The work light of claim 7, further comprising a key structure and a corresponding receiving structure, one being located on a lower portion of the head and the other proximate the extendable neck such that, when the head is stowed, the key structure and receiving structure interact to rotationally secure lower portion of the head relative the cylindrical body.

9. The work light of claim 8, at least one of the set of structures consisting of the key structure and the receiving structure further comprising an elastomeric cushion.

10. The work light of claim 1, further comprising a plurality of springs, at least one associated with each leg, which bias each leg in a deployed position and a restraining structure to selectively hold the legs in a stowed position against the bias.

11. The work light of claim 10, the restraining structure comprising a keying structure that, when the head is stowed, secures the at least one leg against the spring bias, thereby preventing movement of the legs in accordance with the spring bias.

12. The work light of claim 11, the head comprising two sections, an upper section and the lower section, capable of rotation relative each other, said sections also being the switching mechanism.

13. The work light of claim 12, further comprising a key structure and a corresponding receiving structure, one being located on a lower portion of the head and the other proximate the extendable neck such that, when the head is stowed, the key structure and receiving structure interact to rotationally secure lower portion of the head relative the cylindrical body.

14. The work light of claim 13, at least one of the set of structures consisting of the key structure and the receiving structure further comprising an elastomeric cushion.

15. The work light of claim 11, further comprising a double hinged joint that joins the head to the extendable neck.

16. The work light of claim 15, the joint further comprising a fixed stop such that the head may not move beyond a vertical orientation, such that the head axis and body axis are coaxial.

17. The work light of claim 16, the head comprising two sections capable of rotation relative each other, said sections also being the switching mechanism.

18. The work light of claim 17, further comprising a key structure and a corresponding receiving structure, one being located on a lower portion of the head and the other proximate the extendable neck such that, when the head is stowed, the key structure and receiving structure interact to rotationally secure lower portion of the head relative the cylindrical body.

19. The work light of claim 18, at least one of the set of structures consisting of the key structure and the receiving structure further comprising an elastomeric cushion.

20. The work light of claim 1, further comprising a magnet located on a distal end of the brace stop said magnet having sufficient strength to hold the entire work light against gravity.

\* \* \* \* \*